May 20, 1924.

C. MARX ET AL

THEFT SIGNAL

Filed Aug. 20, 1923

INVENTORS
CARL MARX and
J. ARTHUR LOEB
BY
ATTORNEY

May 20, 1924.  
C. MARX ET AL  
THEFT SIGNAL  
Filed Aug. 20, 1923  
1,494,616  
3 Sheets-Sheet 2

INVENTORS  
CARL MARX and  
J. ARTHUR LOER  
BY  
*Jn A Schiller*  
ATTORNEY

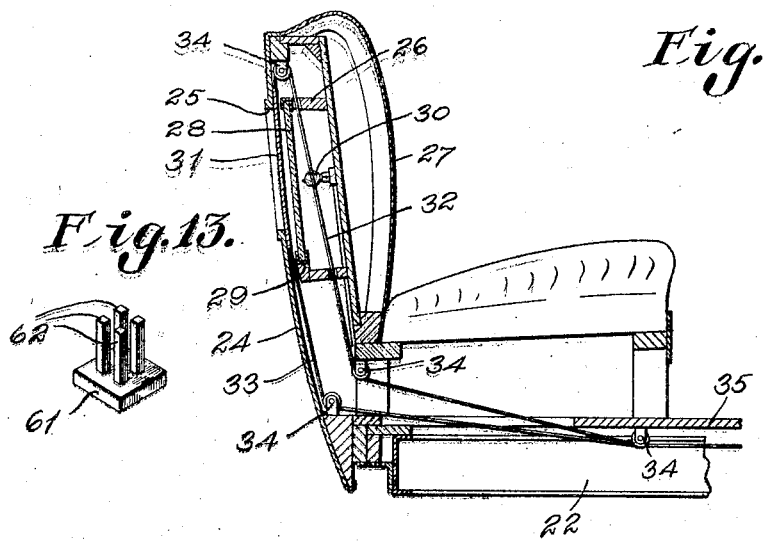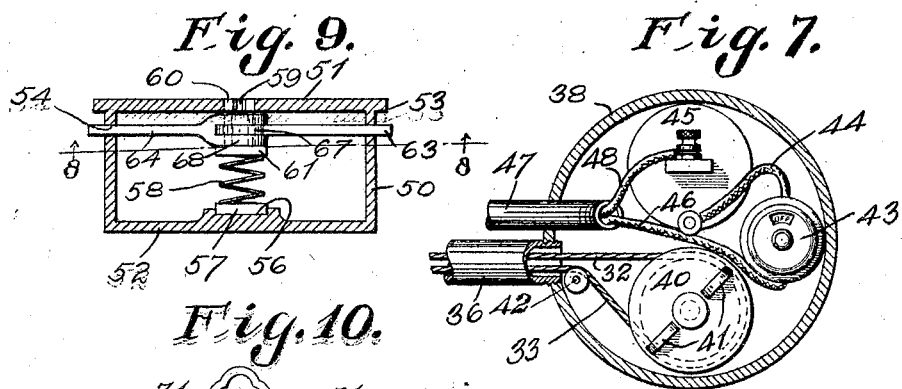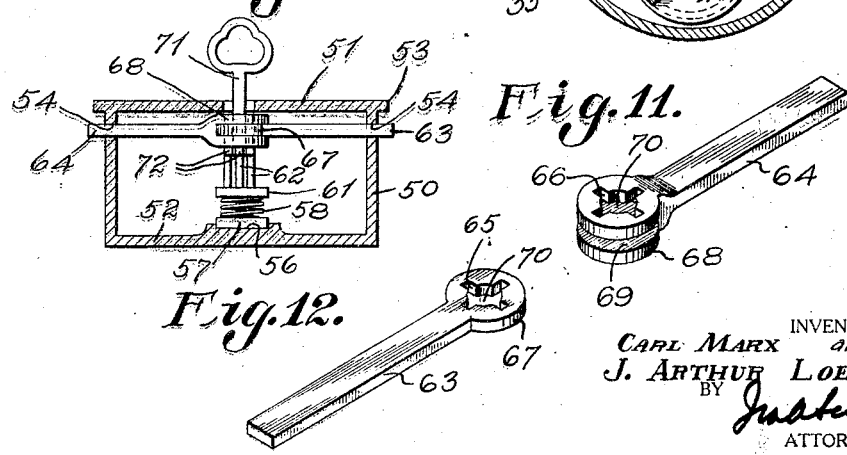

Patented May 20, 1924.

1,494,616

UNITED STATES PATENT OFFICE.

CARL MARX AND JACOB ARTHUR LOEB, OF NEW YORK, N. Y.

THEFT SIGNAL.

Application filed August 20, 1923. Serial No. 658,361.

*To all whom it may concern:*

Be it known that we, CARL MARX and JACOB ARTHUR LOEB, both citizens of the United States, residing, respectively, at 230 Riverside Drive and 97 Fort Washington Avenue, city, county, and State of New York, have invented a new and useful Improvement in Theft Signals, of which the following is a specification.

This invention relates to improvements in theft signals for vehicles and has for its object to provide a device which may be set to indicate when the vehicle is moved by an unauthorized person.

Another object of the invention is to provide a device which may be wholly concealed from view when in inoperative position, so as to avoid marring the appearance of the vehicle.

A further object of the invention is to provide an inclosure for the operating mechanism which will effectively frustrate any attempt of unauthorized persons to tamper therewith.

Still another object of the invention resides in the provision of a cover plate for the mechanism inclosure having a secure and novel lock arranged to permit of the use of a plurality of different combinations, so that no two locks need be alike.

With the above and other objects in view which will become more apparent as the description proceeds, the invention consists in the novel construction, combination and arrangement of parts, which will be fully set forth in the following specification, claimed and illustrated in the accompanying drawing in which:

Figure 5, is an enlarged sectional view taken on line 5—5 of Figure 4.

Figure 7, is a horizontal sectional view through Figure 6.

Figure 9, is a vertical sectional view through said cover showing the locking mechanism in locked position.

Figure 10, is a similar view showing the locking mechanism released.

Figure 11, is a perspective view of one of the locking bolts.

Figure 12, is a similar view of the co-operating locking bolt.

Figure 13, is a perspective view of the pin plate showing the locking pins in detail.

Figure 1:
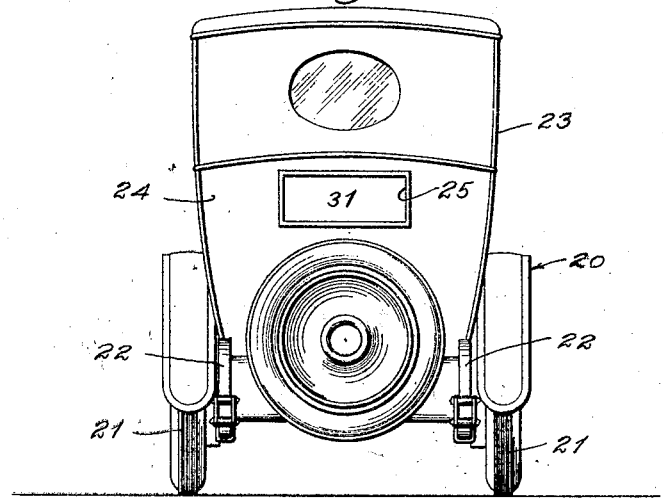
Figure 1, is a rear view of a vehicle equipped with this improved signal, the same being shown in inoperative position.
Figure 2:
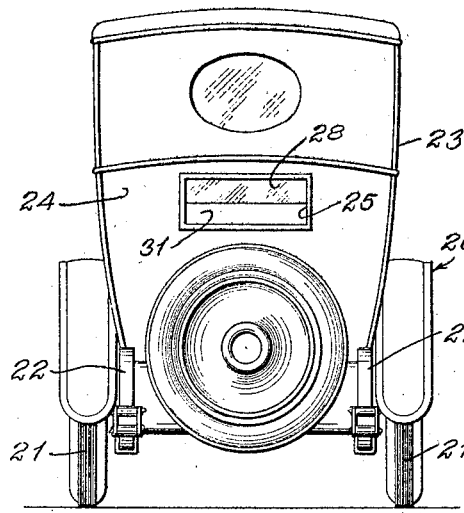
Figure 2, is a view similar to Figure 1, showing the device partly open.
Figure 3:
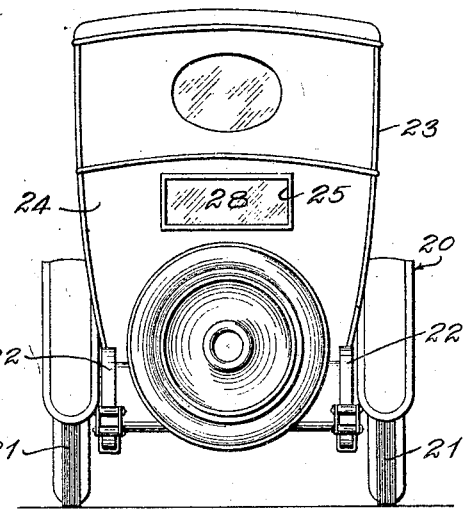
Figure 3, is a similar view, showing the device wholly open.
Figure 4:
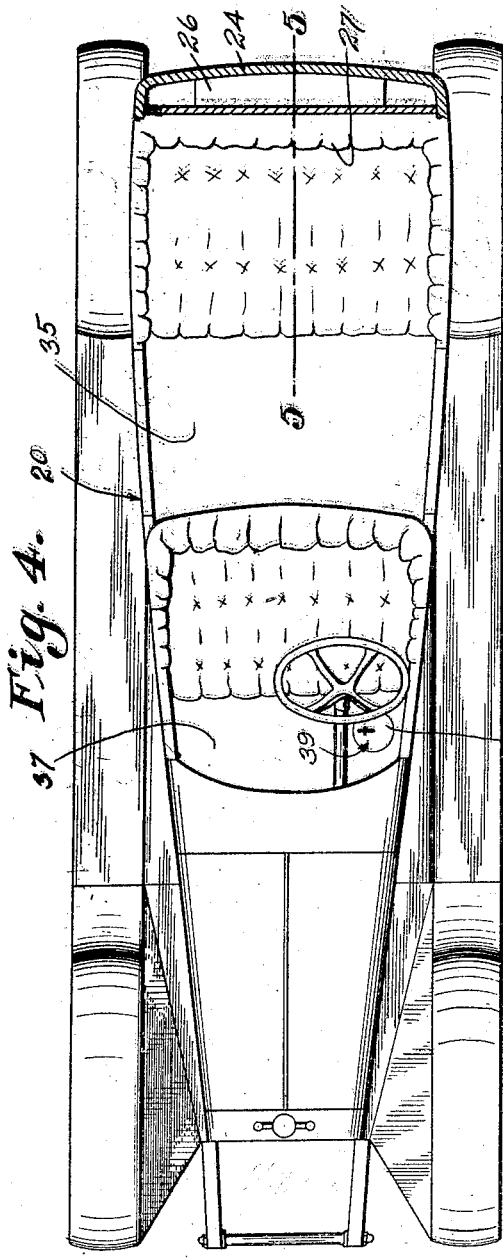
Figure 4, is a top plan view of a car showing the location of the signal and controlling means, portions being in section to more clearly illustrate the same.

Referring to the drawings in detail, the numeral 20 designates in its entirety a motor vehicle of the approved type which consists of the customary running gear mounted on the wheels 21 and supporting the frame or chassis 22 upon which the body 23 is mounted.

As illustrated in Figures 1, 2, 3 and 5, the rear panel 24 of the body 23 is provided with an opening 25. A housing 26 is arranged directly in line with the opening 25 between the panel 24 and the upholstery 27 and the rear wall of said housing is formed of a bullet proof glass 28 mounted in a suitable frame 29 which is rigidly secured to the housing 26. It is to be understood that it is preferable that the words "This is a stolen car if moving" be painted or otherwise attached to the inner face of the glass 28 in such a manner that the light from the lamp bulbs 30 which are secured to the inner wall of the housing may illuminate the letters. It may be found desirable, however, to use another type of sign in which event the lamp bulbs and lettering will be dispensed with and the same mounted in a suitable holder (not shown) within the housing.

In order to preserve the appearance of the vehicle and further to conceal the signal, there is provided a movable panel 31 which is adapted to slide between the outer face of the glass 28 and the inner face of the panel 24 to completely cover the opening 25. The outer face of this panel is preferably finished to match the finish of the body of the car so that when in closed position, the signal will be practically unnoticeable.

In order to move the panel into open or closed position, there are provided cables 32 and 33, which in reality constitute separate runs of the same cable. These cables are attached at their ends to suitable eyes on the upper and lower edges of the panel 31 and are passed over the pulleys 34 to a point beneath the floor boards 35 where they enter an armored tubing 36 which leads forwardly to the housing of the control mechanism to be more fully hereinafter described.

Secured to the floor board 37 of the forward or driver's compartment of the vehicle, is a housing 38 which preferably comprises a hardened steel cylinder closed at its lower end and provided with a screw cap designated generically by the numeral 39.

This housing is provided near its bottom with an opening through which the forward end of the tubing 36 is let in, and rotatably mounted in said housing is a drum 40 around which the bight portion of the cable is wound. Thumb pieces 41 are formed on the upper face of the drum for convenience in turning the drum, and a guide pulley 42 is arranged within the housing to prevent wear on the cable run 33.

Mounted within the housing at some convenient point is a switch 43 to which is connected a wire 44 leading from one terminal of a suitable power source such as a dry cell 45. The opposite terminal of the switch is connected to a wire 46 leading through a conduit 47 to one terminal of each lamp 30 while the opposite terminals of the lamps are connected to the wire 48 leading through conduit to the opposite terminal of the power source. Thus it will be seen that the illumination of the signal is wholly controlled by the switch 43.

Figure 8:
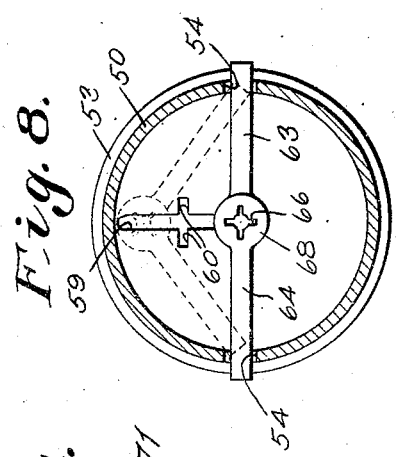
Figure 8, is a horizontal sectional view through the housing cover taken on line 8—8 of Figure 9.

In order to effectively protect the drum 40, switch 43 and power source 45 from being tampered with, and at the same time permit them to be properly manipulated by the proper person, the cover plate best shown in Figures 8 to 10, inclusive, is provided.

Figure 6:
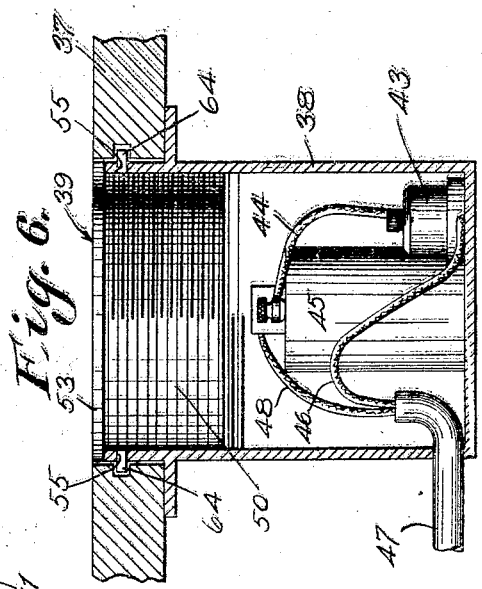
Figure 6, is a vertical sectional view through the housing of the actuating and controlling mechanism.

This cover plate comprises a hollow externally threaded cylinder 50 closed at both its upper and lower ends by walls 51 and 52 respectively. A flange 53 extends outwardly from the upper end of the cylinder 50 and overlies the upper edge of the housing 38 as clearly shown in Figure 6.

Formed in the cylinder 50 at diametrically opposite points are slots 54 which, when the cover is in place on the housing, align with the slots 55 in said housing for a purpose to be more fully hereinafter described.

Formed on the inner face of the bottom wall 52 is a transversely extending guide way 56 which extends in a plane at right angles to the axes of the openings 55 and is adapted to receive a plate 57 carrying the coil spring 58.

A slot 59 is formed in the top wall 51 in axial alignment to the guide way and provided intermediate to the ends of said slot are aligning slots 60 to facilitate the insertion of the key.

Yieldably supported on the upper end of the spring 58 is a plate 61 to which are secured in spaced relation a plurality of vertically extending pins 62 which when the locking bolts 63 and 64 are in projected position engage in the notches 65 and 66 and prevent said bolts from becoming disengaged. The locking bolts above referred to are best shown in Figures 11 and 12 and comprise the bolt elements 63 and 64, which are formed with enlarged heads 67 and 68, the head 68 being bifurcated as 69 to receive the head 67. As shown when the bolts are in axial alignment, the notches in the heads are also aligned so that the pins 62 may readily project therethrough, and when the pins are projected, the bolts will be held against relative rotation. Each head is formed centrally with an opening 70 to accommodate the shank 71 of the key, so that when said key is inserted and the plate 61 depressed sufficiently to prevent the pins 62 from engaging in the notches 65 and 66, the bolts will be free to rotate about the shank of the key which acts as a pivot.

Figure 14:
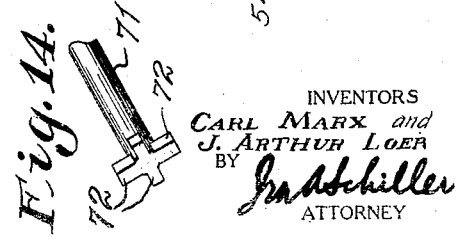
Figure 14, is a perspective view of the key.

The key above described is best shown in Figure 14 and comprises the shank 71 formed at one end with a bit comprising a plurality of radiating lugs 72, the number and positions of which are determined by the number and positions of the notches 65 and 66, and the pins 62.

When it is desired to unlock the cover, the key is inserted through the slot 59 and positioned so that the lugs 72 align with the notches and pins, after which pressure is applied to the key thus compressing the spring 58 as shown in Figure 10 and forcing the pins 62 out of the notches. As soon as the lugs 72 have passed clear through the notches, it is obvious that the bolts may swing about the shank 71 of the key and upon moving the key through the slot 59 the bolts will assume the position shown in dotted lines in Figure 8 so that their ends will be wholly withdrawn from their position in the slots 54 thereby permitting the cover to be unscrewed from its position in the housing 38.

While in the present embodiment, the invention has been shown as being manually operated and controlled, it is quite obvious that automatically controlled electrical devices may be substituted and further so designed that upon movement of the vehicle, the signal will be set in operation and will so remain until the proper person appears and unlocking the device releases the signal.

While in the foregoing there has been shown and described the preferred embodiment of this invention, it is to be understood that minor changes in the details of construction, combination and arrangement of parts may be resorted to without departing from the spirit and scope of the invention as claimed:

What is claimed is:

1. The combination with a vehicle having an opening in its rear panel, of a bullet proof sign mounted in said opening, a movable panel for covering said opening to conceal the sign and means operable from the driver's seat to control the movements of the panel.

2. The combination with a vehicle having an opening in its rear panel, of a bullet proof sign mounted in said opening, a movable panel for covering said opening to conceal the sign, means for illuminating the sign and means operable from the driver's seat to control the movements of the panel.

3. The combination with a vehicle having an opening in its rear panel, a bullet proof sign in said opening, a movable panel for closing the opening to conceal the sign, a housing remote from the sign and panel, means in the housing for cotrolling the opening and closing of the panel, a cover for said housing and means to lock the cover to said housing.

4. The combination with a vehicle theft signal, of a housing for inclosing the controlling means for said signal, a cover plate for said housing, a pair of locking bolts carried by the cover plate and adapted to engage the housing to prevent removal of the cover plate and key actuated means locking said bolts.

5. In a device of the class described, a housing, a hollow cover plate for said housing, said cover plate and housing having diametrically opposed slots therein, a pair of locking bolts adapted to be projected through said slots, heads on the inner ends of said bolts, a yielding plate beneath the heads, said heads having notches therein, pins on the plate for projecting through the notches to hold the bolts in locked position, a key having a shank adapted to be projected through the heads on the bolts, and lugs on the key shank for engaging the pins to force them out of the notches whereby the bolts will be free to swing about the key shank and be withdrawn.

CARL MARX.
J. ARTHUR LOEB.